United States Patent
Shearin

(10) Patent No.: US 9,095,922 B1
(45) Date of Patent: Aug. 4, 2015

(54) TACK WELD PURGING SYSTEM

(76) Inventor: Jason Shearin, Indian Trail, NC (US)

(*) Notice: Subject to any disclaimer, the term of this patent is extended or adjusted under 35 U.S.C. 154(b) by 742 days.

(21) Appl. No.: 13/186,588

(22) Filed: Jul. 20, 2011

(51) Int. Cl.
| | |
|---|---|
| *B23K 9/00* | (2006.01) |
| *B23K 9/18* | (2006.01) |
| *B23K 13/06* | (2006.01) |
| *B23K 31/02* | (2006.01) |
| *B23K 35/38* | (2006.01) |
| *B23K 9/173* | (2006.01) |
| *H05H 1/34* | (2006.01) |
| *B23K 1/008* | (2006.01) |
| *B23K 9/16* | (2006.01) |
| *B23K 9/32* | (2006.01) |
| *B23K 9/29* | (2006.01) |

(52) U.S. Cl.
CPC ............ *B23K 9/173* (2013.01); *B23K 1/008* (2013.01); *B23K 9/16* (2013.01); *B23K 9/291* (2013.01); *B23K 9/296* (2013.01); *B23K 9/325* (2013.01); *B23K 2201/42* (2013.01); *H05H 1/34* (2013.01)

(58) Field of Classification Search
CPC ...... B23K 9/173; B23K 9/2201; B23K 9/325; B23K 1/008; B23K 9/296; B23K 9/291; B23K 9/16; B23K 2201/42; H05H 1/34
USPC .......... 219/74, 75, 137.9, 137.62, 137.63, 61, 219/72, 105, 136, 137.41, 115, 98, 99; 228/103, 214, 219; 239/112, 104, 106, 239/690, 706, 707; 134/1.3, 902; 138/44, 138/45, 46
See application file for complete search history.

(56) References Cited

U.S. PATENT DOCUMENTS

| | | | |
|---|---|---|---|
| 2,510,415 A * | 6/1950 | Pitcher | 219/137.42 |
| 3,053,968 A * | 9/1962 | Gorman et al. | 219/74 |
| 3,253,116 A | 5/1966 | Kensrue | |
| 3,521,023 A * | 7/1970 | Dahlman et al. | 219/75 |
| 3,811,027 A * | 5/1974 | Strahan | 219/74 |
| 3,875,364 A * | 4/1975 | Boyett | 219/74 |
| 3,876,852 A * | 4/1975 | Topham | 219/72 |
| 3,989,920 A | 11/1976 | Masubuchi et al. | |
| 4,496,823 A | 1/1985 | Mann | |
| 4,567,343 A * | 1/1986 | Sullivan et al. | 219/74 |
| 4,654,500 A | 3/1987 | Stiles et al. | |
| 4,667,083 A * | 5/1987 | Stol | 219/136 |
| 4,788,401 A * | 11/1988 | Kleppen | 219/75 |
| 5,338,917 A * | 8/1994 | Stuart et al. | 219/137.63 |
| 5,484,973 A | 1/1996 | Gittens et al. | |
| 5,556,550 A * | 9/1996 | Fyffe | 219/75 |
| 5,558,131 A * | 9/1996 | Cohee et al. | 138/93 |
| 5,772,102 A * | 6/1998 | New et al. | 228/42 |
| 6,005,221 A | 12/1999 | Cusick, III | |
| 6,390,134 B1 | 5/2002 | Hanby | |
| 6,439,267 B2 * | 8/2002 | Welker | 138/39 |
| 6,525,288 B2 * | 2/2003 | Rehrig | 219/74 |
| 6,610,957 B2 | 8/2003 | Uttrachi | |
| 6,637,640 B1 * | 10/2003 | Sennett | 228/44.3 |
| 6,702,197 B2 | 3/2004 | Hsuch et al. | |

(Continued)

*Primary Examiner* — Sang Y Paik
*Assistant Examiner* — Gyounghyun Bae

(57) ABSTRACT

A purging system and method for providing an inert gas to a welding site. This comprises a reduction connector adapted to be connected to a source of inert gas having an inlet port and an outlet port, wherein the outlet port is connected to a cylindrical outlet bore within the reduction connector. There is a gas lens comprised of a solid cylinder of metal mesh disposed in the cylindrical outlet bore. Also provided is a cylindrical nozzle mounted to the reduction connector, the cylindrical nozzle being adapted to funnel the inert gas to the welding site.

9 Claims, 6 Drawing Sheets

(56) References Cited

U.S. PATENT DOCUMENTS

| 7,066,789 | B2 * | 6/2006 | Tannous et al. | 451/37 |
| 7,105,766 | B2 * | 9/2006 | Samler | 219/75 |
| 7,170,032 | B2 * | 1/2007 | Flood | 219/137 R |
| 7,246,736 | B2 | 7/2007 | Wang et al. | |
| 7,253,373 | B2 * | 8/2007 | Delgado | 219/75 |
| 7,329,826 | B2 * | 2/2008 | Delgado et al. | 219/75 |
| 7,576,300 | B2 * | 8/2009 | Giese | 219/137.61 |

\* cited by examiner

TACK WELD PURGING SYSTEM

BACKGROUND OF THE INVENTION

The invention relates generally to a method and apparatus for providing an inert gas atmosphere to a welding location. More particularly, the invention relates to a method and apparatus for providing an inert gas shield within an interior of a conduit that is being welded.

Metal inert gas welding is a semi-automatic or automatic arc welding process in which a continuous and consumable wire electrode and a shielding gas are fed through a welding gun. Metal inert gas welding is applied to steels because it allows for lower welding time compared to other welding processes. The cost of an inert gas such as a noble gas is high, but regardless, this technique is the most common industrial welding process, preferred for its versatility, speed and the relative ease of adapting the process to a variety of manufacturing situation.

When welding two sections of pipe, the interior portion of the pipe is filled with an inert gas, such as argon. The application of this inert gas is to prevent oxidation at the welding site. To achieve optimal weld quality, a weld bead must be shielded with a protective atmosphere to protect it against detrimental effects of oxidation prior to, during, or subsequent to joining the metal components. Accordingly, a continuous flow of gaseous flux is typically applied to the joining location to expel the ambient atmosphere to prevent oxidation and thereby promote better union of the metal components. Such gaseous flux typically involves a shielding gas composed of a chemically inert gas such as the noble gases helium and argon. During welding, the gaseous flux protects the work from oxidation, and cleans or catalytically enter into the reaction between the materials being united. Therefore, the welding torch, or a separate gas nozzle, typically blasts the top surface of the weld bead with a continuous stream of shielding gas.

However, this technique requires a closed environment for containing the gas within the pipe, using masking tape, pipe plugs, etc. This is inefficient and obtrusive for the welder and pipe fitter spot-welding the two sections of pipe together during the initial fit-up stage of joining the pipe. Further, a great deal of inert gas is used to fill the entire pipe, which is both expensive and unhealthy for the welder and pipe fitter.

Many have attempted to reduce shielding gas waste in the past. One attempt is a delivery hose with a gas surge-restricting orifice at the gas solenoid end of the hose. Another suggestion is a porous diffuser in a weld shield to deliver the gas to the weld path. Another proposal is a series of removable orifice bodies which may be threaded into a valve body. One suggestion is not to fill area around the weld bead, but to merely blast the target weld path with gas.

While the above mentioned methods and apparatus may be suitable for the particular purpose employed, or for general use, they would not be as suitable for the purposes of the present invention as disclosed hereafter.

SUMMARY OF THE INVENTION

It is an object of the invention to produce a device that makes the "fit-up" stage of pipe fitting faster and more efficient.

Accordingly, the present invention provides of a purging system for providing an inert gas to a welding site. This comprises a reduction connector adapted to be connected to a source of inert gas having an inlet port and an outlet port, wherein the outlet port is connected to a cylindrical outlet bore within the reduction connector. There is a gas lens comprised of a solid cylinder of metal mesh disposed in the cylindrical outlet bore. Also provided is a cylindrical nozzle mounted to the reduction connector, the cylindrical nozzle being adapted to funnel the inert gas to the welding site.

Further, the present invention includes a method for providing an inert gas to a welding site. First, this comprises directing the inert gas through a reduction connector having an inlet port and a cylindrical outlet bore. Second, disposing a gas lens of a solid cylinder of metal mesh in the cylindrical outlet bore of the reduction connector to create small bubbles of the inert gas. Third, mounting a cylindrical nozzle to the reduction connector to funnel the small bubbles of the inert gas to the welding site.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
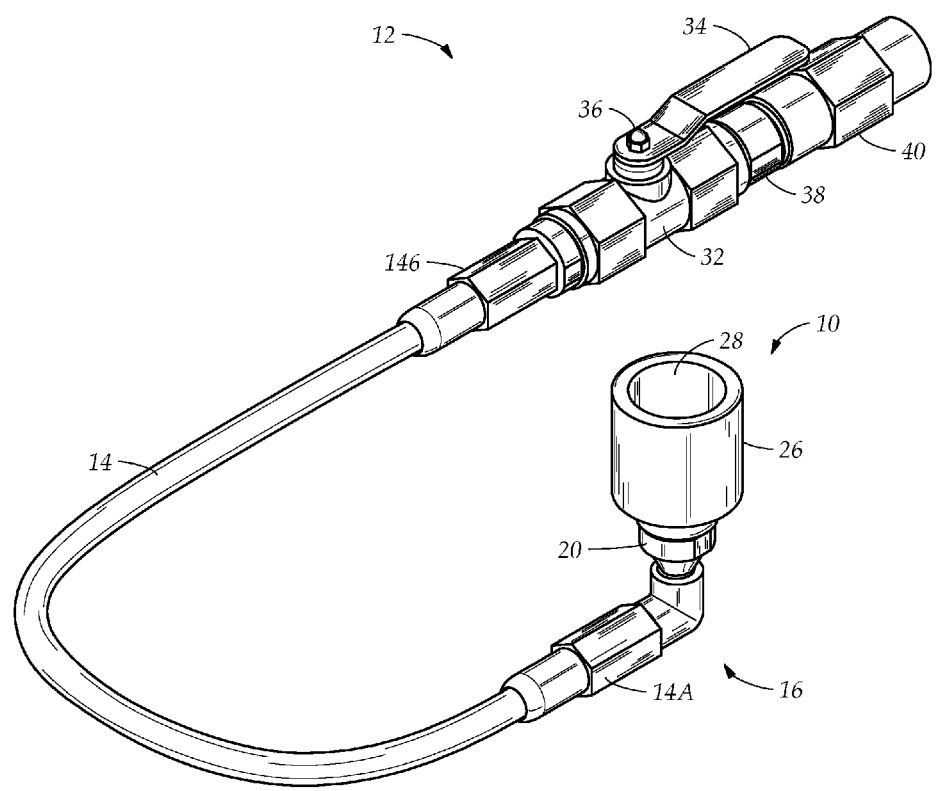
FIG. 1 is a three-dimensional front view of the tack weld purging system, in accordance with the present invention.

FIG. 1 illustrates a three-dimensional front view of a tack weld purging system 10 (hereafter "tack system"). In general terms, the tack system 10 is designed to assist during the fit-up stage of pipe fitting. The tack system 10 alleviates the problems associated with the current method. tack system 10 is designed to expel inert gas directly at the welding location on the interior of the pipe. The gas flows through the gas valve 12 (further described below in reference to FIG. 3), which is controlled by the pipe fitter. The inert gas flows through gas valve 12 and into line 14 until reaching gas distribution device 16, as shown in FIG. 1 and (further described in reference to FIG. 2). The inert gas is directed specifically to the welding site, thereby preventing oxidation. This both eliminates the obstructions from the masking tape, pipe plugs, etc. and greatly reduces the amount of inert gas that is necessary to prevent oxidation. The welding process becomes more efficient for the welder, and less expensive for the company owner, as the amount of inert gas required is significantly reduced, by as much as 50%.

Figure 2:
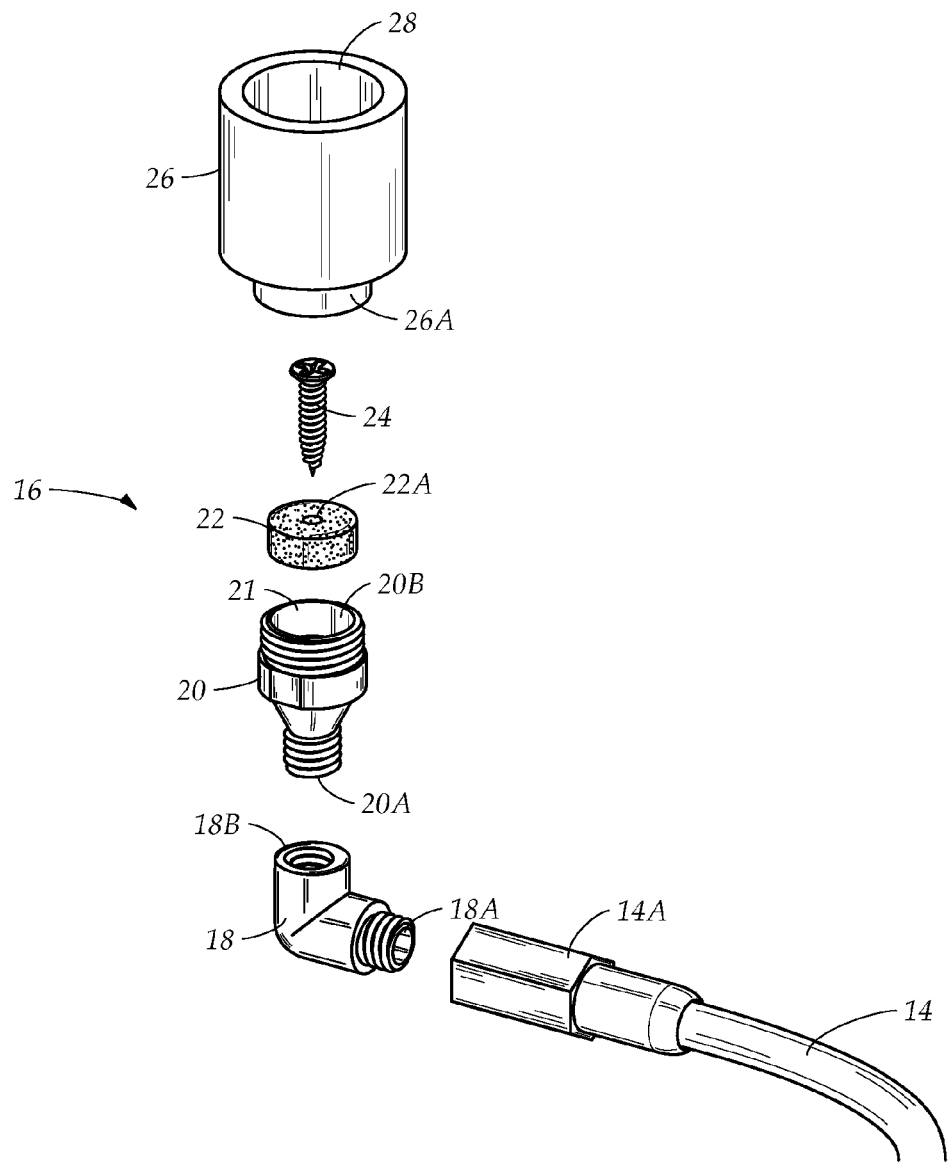
FIG. 2 is an exploded three-dimensional view of the gas distribution port of the tack weld Purging System, in accordance with the present invention.

FIG. 2 is a three-dimensional exploded perspective view of the gas distribution device 16. The inert gas flows through gas distribution device 16 and is directed to the welding site to distribute the gas.

Gas distribution device 16 includes an L-shaped elbow fitting 18 that is threaded on both ends 18a and 18b to attach both to the line 14 at connector 14a and to reduction connector 20. Elbow fitting 18 acts as a coupling to join line 14 with reduction connector 20.

Figure 4:
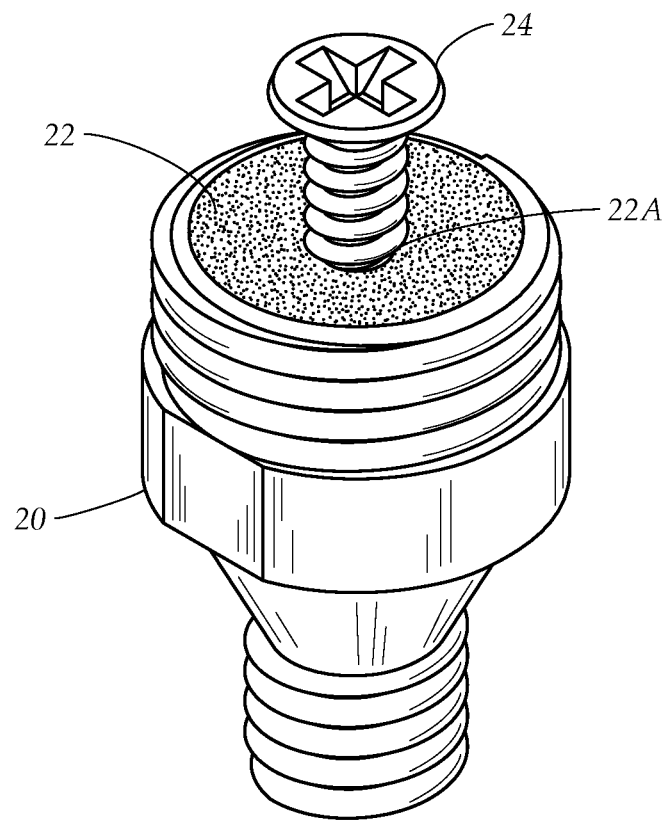
FIG. 4 is a three-dimensional front view of the gas lens within the reduction connector of the tack weld purging system, in accordance with the present invention.

Reduction connector 20 has an inlet port 20a and an outlet port 20b. The outlet port 20b is connected to a cylindrical outlet bore 21 that accommodates gas lens 22 (as seen in FIG. 4). Gas lens 22 is a solid cylinder composed of several layers of fine metal mesh, and has a passageway 22a extending therethrough. According to the present embodiment, a plug, such as screw 24, is screwed into passageway 22a to close the passageway and prevent gas from flowing therethrough. The purpose of gas lens 22 is to disperse the inert gas flowing through line 14 and to create small bubbles of the desired inert gas, and eliminate other gases, primarily oxygen. When passageway 22a is left open, such as to thread welding wire therethrough, the inert gas is caused to swirl and become diluted with surrounding air. Screw 24, which is preferably constructed of brass, is inserted through passageway 22a to prevent the inert gas from swirling, ensuring that the inert gas that reaches the weld site is concentrated.

Figure 5:
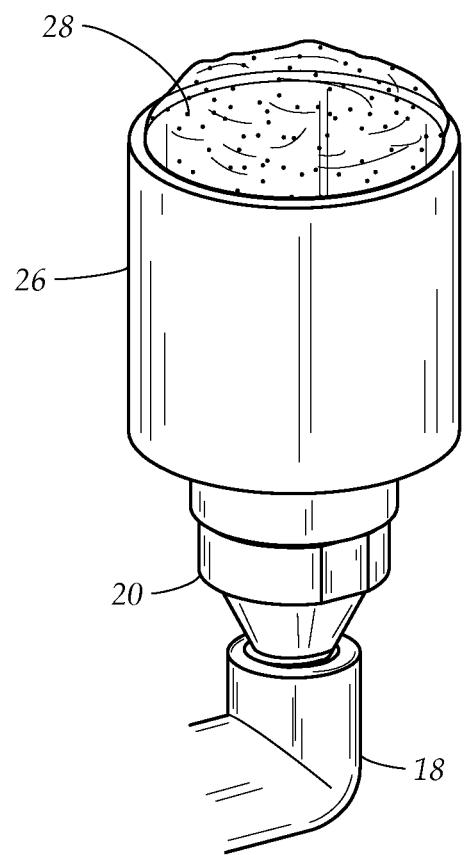
FIG. 5 is a three-dimensional front view of the cylindrical nozzle of the tack weld purging system in use, in accordance with the present invention.

Reduction connector 20 is threaded to securely attach to threaded inlet 26a of cylindrical nozzle 26. Cylindrical nozzle 26 funnels the inert gas and expels it through outlet port 28, where it is directed to the welding site (as seen in FIG. 5).

Figure 3:
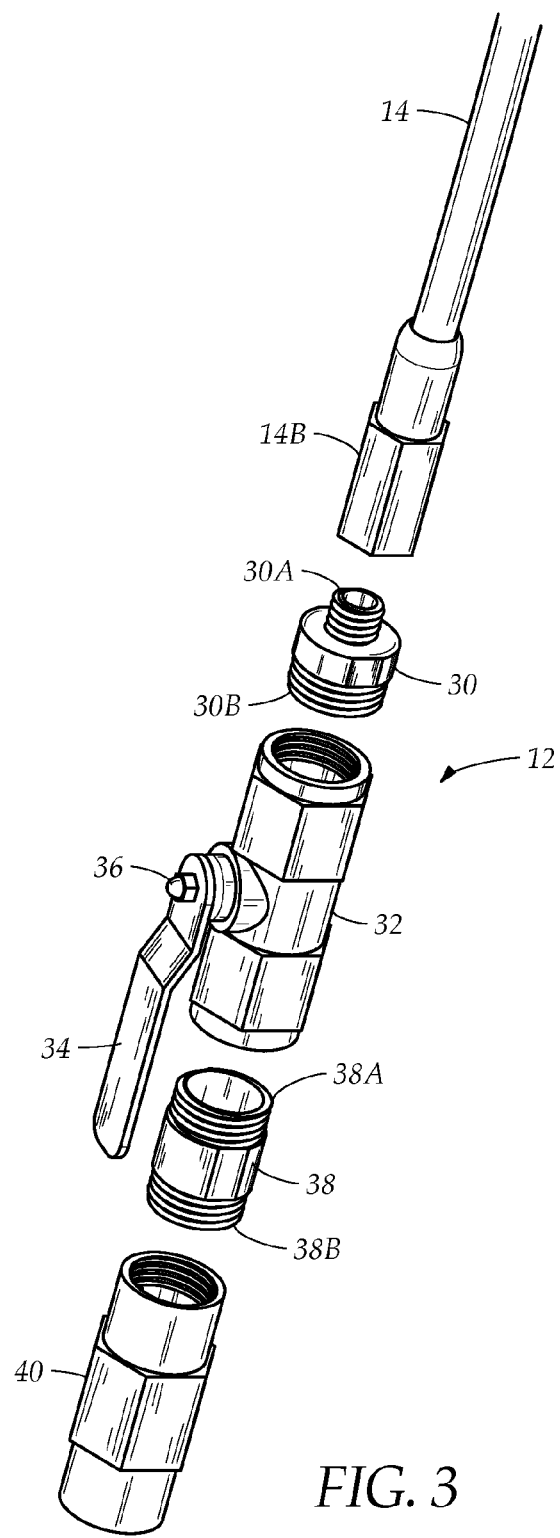
FIG. 3 is an exploded three-dimensional view of the gas valve of the tack weld purging system, in accordance with the present invention.

FIG. 3 is a three-dimensional exploded perspective view of the gas valve 12. Reducing coupling 30 is threaded on ends 30a and 30b to threadedly mount to both connector 14b of line 14, and on/off valve 32.

On/off valve 32 allows the pipe fitter/welder to control the flow of the inert gas. When the handle 34 is engaged in the "on" position, as shown in FIG. 3, gas is permitted to flow through on/off valve 32. However, when handle 34 is in the "off position," gas is prevented from flowing through valve 32. Handle 34 is operated by rotating it 45° about screw 36, which mounts handle 34 to on/off valve 32.

Coupling 38 is threaded on both ends 38a and 38b to connect on/off valve 32 with inlet coupling 40. Inlet coupling 40 is connected to a source of inert gas (not shown) and directs the inert gas, such as argon, into gas valve 12.

FIG. 4 is a three-dimensional front view of the gas lens 22 within the reduction connector 20. While a screw 24 is shown closing passageway 22a, it's within the terms of the present invention to form the gas lens 22 without a passageway and thereby eliminate the need for screw 24.

FIG. 5 is a three-dimensional front view of the cylindrical nozzle 26 in use. As illustrated, inert gas is funneled through cylindrical nozzle 26 and expelled through outlet port 28.

Figure 6:
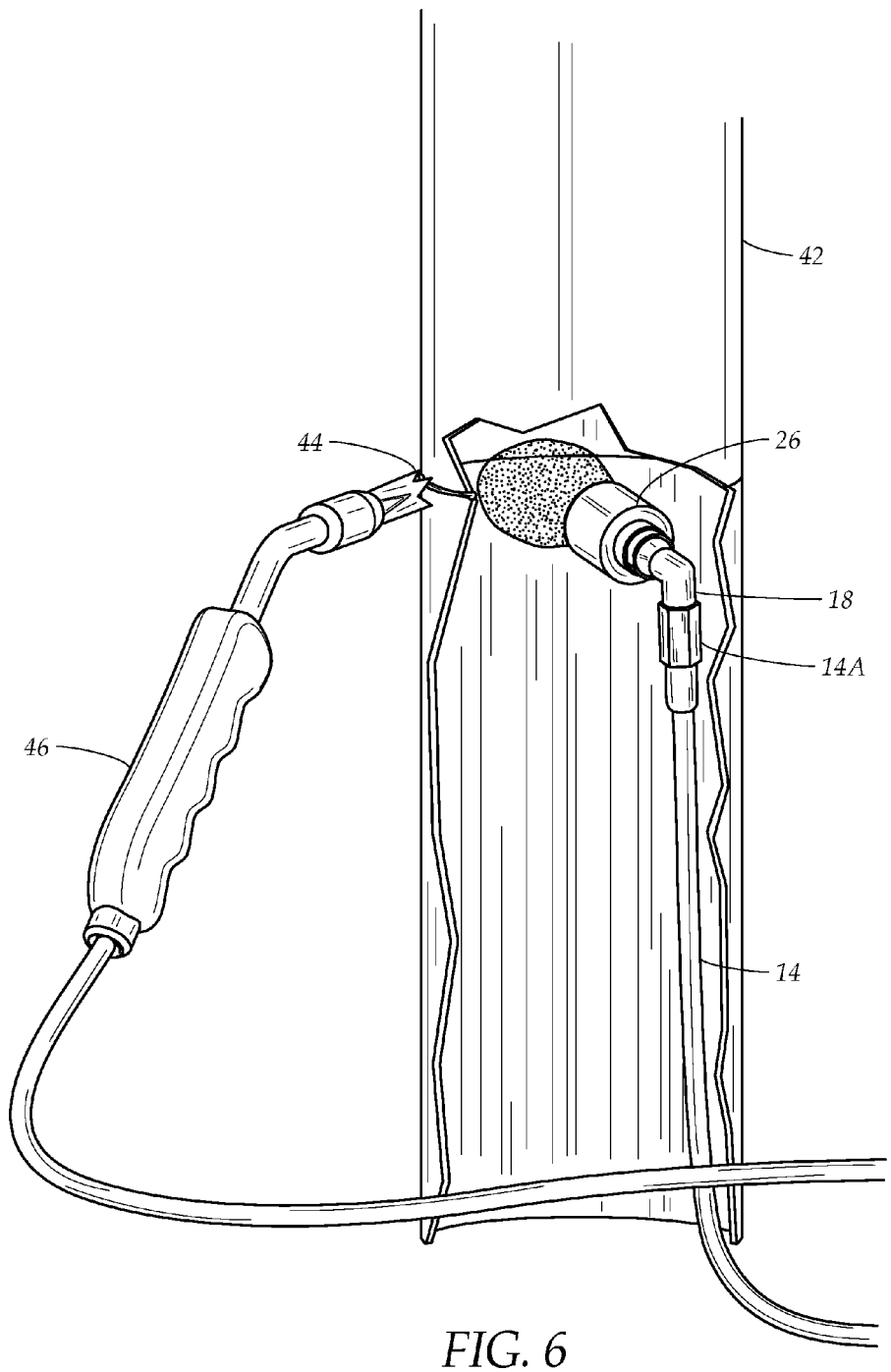
FIG. 6 is a front three-dimensional view of the tack weld purging system in use, in accordance with the present invention.

FIG. 6 is a front three-dimensional view of the tack system 10 in use. Tack system 10 is located within pipe 42. Inert gas is expelled from the cylindrical nozzle 26 at the welding location 44. As previously discussed, this prevents oxidation. Welding gun 46 is held externally to the pipe 42.

In conclusion, herein is presented a tack weld purging system. The invention is illustrated by example in the drawing figures, and throughout the written description. It should be understood that numerous variations are possible, while adhering to the inventive concept. Such variations are contemplated as being a part of the present invention.

What is claimed is:

1. A purging system for providing an inert gas to a welding site at a remote location within the bore of a stainless steel pipe, said system comprising:
    a reduction connector adapted to be connected to a source of inert gas, said connector having an inlet port and an outlet port, wherein the outlet port is connected to a cylindrical outlet bore within the reduction connector,
    a gas lens comprised of a substantially homogenous cylinder of metal mesh disposed in the cylindrical outlet bore,
    a cylindrical nozzle mounted to the reduction connector, an elongated inert gas supply line connecting said inert gas source to said reduction connector by means of an elbow fitting, whereby said gas can be conveyed precisely to the remote welding site within said bore, wherein the cylindrical nozzle is adapted to funnel the inert gas to the welding site,
    wherein the cylinder of metal mesh has several layers of fine mesh,
    wherein the cylinder of metal mesh has a passageway extending therethrough,
    wherein the cylinder of metal mesh has a plug in the passageway, and
    wherein the plug is a screw.

2. The purging system of claim 1 wherein the cylinder of metal mesh has several layers of fine mesh.

3. The purging system of claim 2 wherein the cylinder of metal mesh has a passageway extending therethrough.

4. The purging system of claim 3 wherein the cylinder of metal mesh has a plug in the passageway.

5. The purging system of claim 4 wherein the plug is a screw.

6. The purging system of claim 5 wherein the cylindrical nozzle has an inlet port connected to the reduction connector.

7. The purging system of claim 6 wherein the cylindrical nozzle has an outlet port through which the inert gas is directed to the welding site.

8. The purging system of claim 7 including a fitting, coupling the reduction connector with a gas line adapted to provide the inert gas to be conveyed to the welding site.

9. The purging system of claim 8 further including a gas valve in the gas line that controls the flow of inert gas through said gas line.

\* \* \* \* \*